(12) United States Patent
Reiderman et al.

(10) Patent No.: US 8,239,172 B2
(45) Date of Patent: Aug. 7, 2012

(54) METHOD OF DEEP RESISTIVITY TRANSIENT MEASUREMENT WHILE DRILLING

(75) Inventors: Arcady Reiderman, Houston, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 320 days.

(21) Appl. No.: 12/272,484

(22) Filed: Nov. 17, 2008

(65) Prior Publication Data

US 2010/0125439 A1 May 20, 2010

(51) Int. Cl.
*H04B 15/00* (2006.01)
*G01V 3/30* (2006.01)
(52) U.S. Cl. .......................... 702/195; 702/7
(58) Field of Classification Search .......... 702/195, 702/7
See application file for complete search history.

(56) References Cited

U.S. PATENT DOCUMENTS

| | | | |
|---|---|---|---|
| 4,796,186 A | 1/1989 | Kaufman | |
| 5,038,107 A | 8/1991 | Gianzero et al. | |
| 5,452,761 A | 9/1995 | Beard et al. | |
| 7,027,922 B2 * | 4/2006 | Bespalov et al. | 702/7 |
| 7,150,316 B2 * | 12/2006 | Itskovich | 166/248 |
| 7,167,006 B2 | 1/2007 | Itskovich | |
| 2004/0098201 A1 | 5/2004 | Tabarovsky | |
| 2005/0092487 A1 | 5/2005 | Banning et al. | |
| 2006/0061364 A1 | 3/2006 | Banning et al. | |
| 2007/0108981 A1 | 5/2007 | Banning-Geertsma et al. | |
| 2007/0168133 A1 * | 7/2007 | Bennett et al. | 702/6 |
| 2007/0216416 A1 | 9/2007 | Itskovich | |
| 2007/0256832 A1 | 11/2007 | Hagiwara et al. | |

OTHER PUBLICATIONS

Draper et al., "Applied Regression Analysis", 1981 John Wiley & Sons, 2nd Edition, pp. 458-464.*

* cited by examiner

*Primary Examiner* — Jonathan C Teixeira Moffat
*Assistant Examiner* — Regis Betsch
(74) *Attorney, Agent, or Firm* — Mossman, Kumar & Tyler PC (57) ABSTRACT

A transient electromagnetic signal is recorded in an earth formation in the presence of a pipe having a finite conductivity. A portion of the signal dominated by the pipe signal is analyzed to determine a functional representation, extrapolated back to a time interval where the formation signal is present and subtracted from the recorded signal to provide a corrected signal.

18 Claims, 7 Drawing Sheets

METHOD OF DEEP RESISTIVITY TRANSIENT MEASUREMENT WHILE DRILLING

BACKGROUND OF THE DISCLOSURE

1. Field of the Disclosure

The disclosure is related to the field of electromagnetic induction well logging for determining the resistivity of earth formations penetrated by a wellbore. More specifically, the disclosure relates to measuring the transient signals in an induction tool having a metallic pipe with finite, non-zero and high conductivity.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available downhole.

Deep transient logging while drilling (LWD), especially "look-ahead" capability, was shown to have a great potential in predicting over-pressured zones, detecting faults in front of the drill bit in horizontal wells, profiling massive salt structures, etc. One of the main problems of deep transient measurements in LWD application is a parasitic signal due to the conductive drill pipe. A variety of techniques have been used to reduce this parasitic signal in the acquired data. For the purposes of the present disclosure, we adopt the following definition of the term "Transient Electromagnetic Method" from the Schlumberger Oilfield Glossary:

A variation of the electromagnetic method in which electric and magnetic fields are induced by transient pulses of electric current in coils or antennas instead of by continuous (sinusoidal) current.

Among the methods that have been used to reduce the parasitic signal due to a conductive drill pipe are using ferrite and copper shielding, using a reference signal (bucking) for calibration purposes, and using the asymptotic behavior of the conductive pipe time response to filter out the pipe signal.

U.S. Pat. No. 7,027,922 to Bespalov, having the same assignee as the present disclosure and the contents of which are incorporated herein by reference is of particular interest. As disclosed in Bespalov, the transient signal may be represented by the Taylor Series expansion:

$$\begin{pmatrix} H_z(t_1) \\ H_z(t_2) \\ \vdots \\ H_z(t_{m-1}) \\ H_z(t_m) \end{pmatrix} = \begin{pmatrix} t_1^{-1/2} & t_1^{-3/2} & t_1^{-5/2} & \cdots & t_1^{-n/2} \\ t_2^{-1/2} & t_2^{-3/2} & t_1^{-5/2} & \cdots & t_2^{-n/2} \\ \vdots & \vdots & \vdots & \cdots & \vdots \\ t_{m-1}^{-1/2} & t_{m-1}^{-3/2} & t_{m-1}^{-5/2} & \cdots & t_{m-1}^{-n/2} \\ t_m^{-1/2} & t_m^{-3/2} & t_m^{-3/2} & \cdots & t_m^{-n/2} \end{pmatrix} \begin{pmatrix} S_{1/2} \\ S_{3/2} \\ S_{5/2} \\ \vdots \\ S_{(2n-1)/2} \end{pmatrix}$$

Where $H_z$ is the z-component of the magnetic field, t is the time and the S-s are expansion coefficients. As discussed in Bespalov, the $S_{1/2}$ and $S_{3/2}$ terms are dominated by the effects of the conductive pipe, and estimating and correcting for at least the $S_{1/2}$ component and, optionally, also the $S_{3/2}$ component gives a transient response that is sensitive to the distance to bed boundaries.

In case the target DOI of up to 50 meters the conductive pipe signal is typically more than two orders of magnitude greater than the formation signal even if the ferrite and copper shields are used. Under these conditions, the accuracy of bucking (e.g. due to exposure to the down-hole conditions), and asymptotic filtering may not be sufficient to facilitate measurements. The present disclosure addresses the problems for extra deep resistivity measurements.

SUMMARY OF THE DISCLOSURE

One embodiment of the disclosure is a method of evaluating an earth formation using a tool conveyed within a borehole in the earth formation. The tool has a body with a finite, non-zero conductivity. The method includes using a transmitter on the tool for producing a transient electromagnetic signal in the earth formation; using at least one receiver for receiving a signal resulting from interaction of the transient signal with the earth formation, the received signal has a first time interval that includes a first component responsive to a property of the earth formation and a second component responsive to the conductivity of the tool, and has a second time interval responsive substantially to the conductivity of the tool; using the received signal in the second time interval and the received signal in the first time interval to estimate the first component of the signal in the first time interval.

Another embodiment of the disclosure is an apparatus configured to evaluate an earth formation. The apparatus includes a tool having a body with a finite, non-zero conductivity configured to be conveyed in a borehole; a transmitter on the tool configured to produce a transient electromagnetic signal in the earth formation; at least one receiver configured to produce a signal responsive to interaction of the transient signal with the earth formation. The signal has a first time interval including a first component responsive to a property of the earth formation and a second component responsive to the conductivity of the tool, and has a second time interval responsive substantially to the conductivity of the tool. The apparatus also includes at least one processor configured to use the produced signal in the second time interval and the produced signal in the first time interval to estimate the first component of the signal in the first time interval.

Another embodiment of the disclosure is a computer-readable medium accessible to at least one processor. The medium includes instructions which enable the at least one processor to process a signal produced by a receiver on a tool in a borehole responsive to a transient signal generated by a transmitter in the borehole to estimate a property of the earth formation. The signal has a first time interval including a first component responsive to a property of the earth formation and a second component responsive to a conductivity of the tool, and has a second time interval responsive substantially to the conductivity of the tool

DESCRIPTION OF EXEMPLARY EMBODIMENTS

Figure 1:
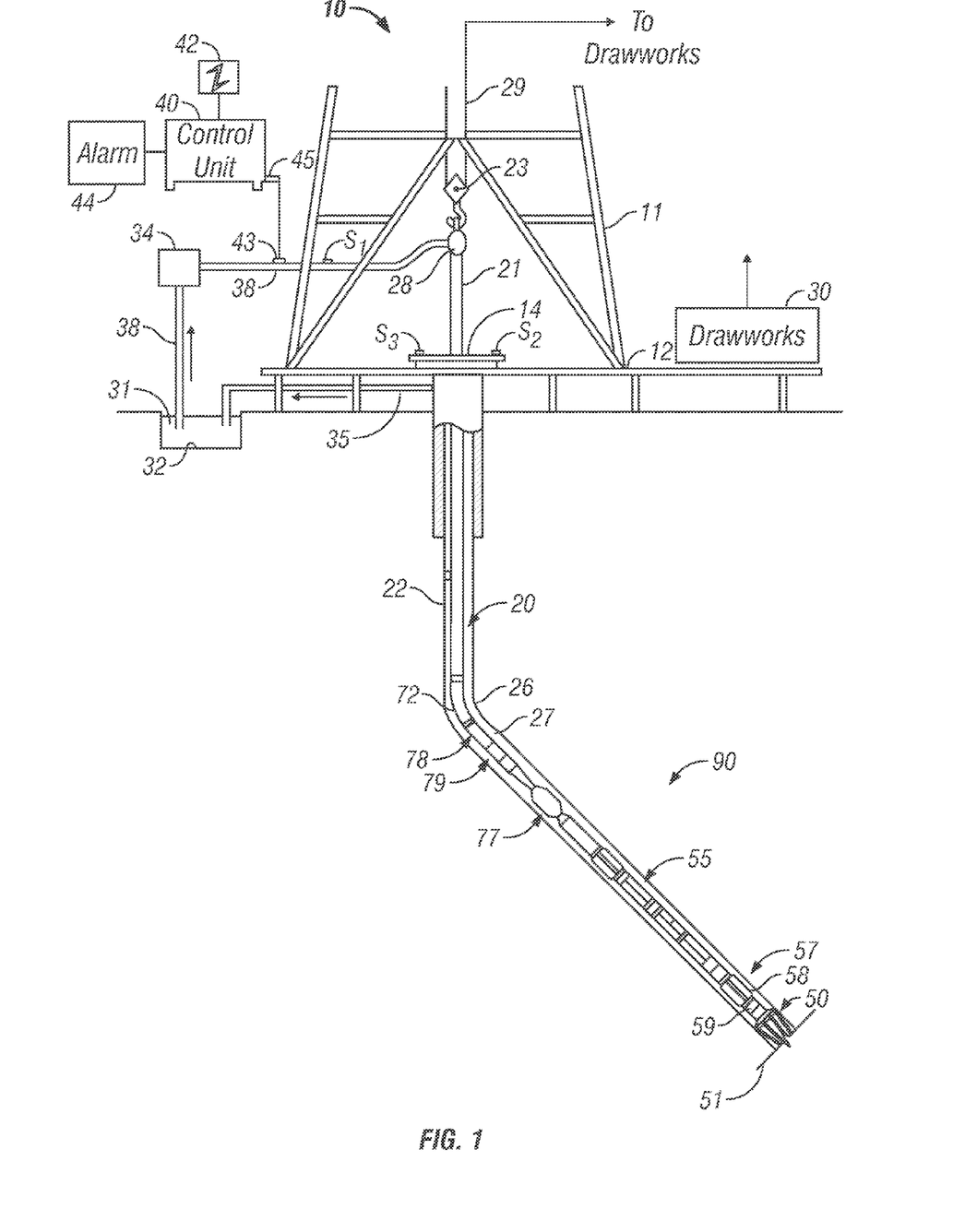
FIG. 1 shows a resistivity logging instrument according to the present disclosure conveyed in a borehole.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ may be placed in the line 38 to provide information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In one embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters may include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 may include a computer or a microprocessor-based processing system, memory for storing programs or models and data, a recorder for recording data, and other peripherals. The control unit 40 may be configured to activate alarms 44 when certain unsafe or undesirable operating conditions occur.

Figure 2:
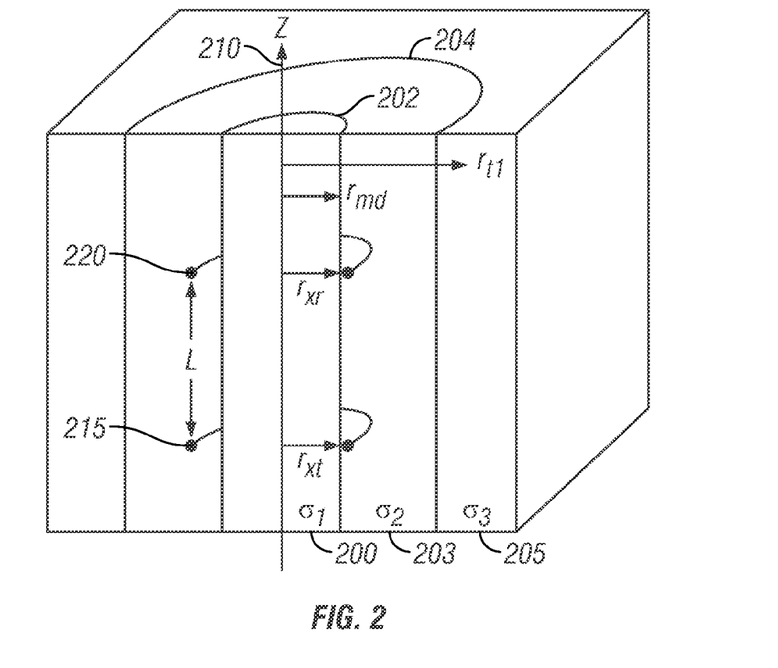
FIG. 2 shows a typical cylindrical wellbore configuration for oil exploration.

FIG. 2 shows an exemplary cylindrical structure, comprising three zones substantially defined by a metal pipe 200 with conductivity $\sigma_1$, and two layers 203, and 205 with conductivities, $\sigma_2$, and $\sigma_3$, respectively. The magnetic permeability of the entire space is $\mu$. As illustrated, the cylindrical boundary 202 separating the metal pipe from the transition layer and the cylindrical boundary 204 separating the regions of transition layer and remote formation share a common z-axis 210.

As measured from the z-axis, the radius of boundary 202 is labeled as $r_{md}$, and the radius of boundary 204 is labeled as $r_{tl}$. An electromagnetic field is excited by a transmitter current loop 215 of radius, $r_{xt}$, and is measured by a receiver loop 220 of radius $r_{xr}$. Transmitter loop and receiver loop are separated by distance L. The amplitude and frequency of the AC transmitter current are I and $\omega$, respectively.

There is only one component $E_\varphi$ of the electric field in the considered model of FIG. 2, and it satisfies the Maxwell's equation detailed in Eq. (1) under the conditions of $$\frac{1}{r}\frac{\partial}{\partial r}\left(r\frac{\partial E_\varphi}{\partial r}\right) - \frac{E_\varphi}{r^2} + \frac{\partial^2 E_\varphi}{\partial z^2} = k^2 E_\varphi \quad (1)$$

where $k_j^2 = -i\omega\mu\sigma_j$, $j = 1, 2, 3$ \quad (2)

As is well known in the art, boundary conditions require a continuity of the tangential electric field $E_\varphi$, and of the tangential magnetic field, $H_z$, at boundaries 202 and 204. These conditions may be expressed mathematically in the form:

$$\begin{cases} [E_\varphi] = 0 \\ \left[\frac{\partial E_\varphi}{\partial r}\right] = 0 \end{cases} \text{ at } r = r_{mn}, r_{tl} \quad (3)$$

An analytical solution for the boundary value problem of Eqs. (1) and (3), may be found using known techniques of the Fourier transform and separation of variables. The resulting expressions for an electromotive force induced in the receiver, $E_f = 2\pi r_{xr} E_\varphi$, are shown below:

$$E_f = \int_0^\infty (F_a + F_b)\cos(\lambda L) d\lambda + \quad (4)$$
$$\frac{i\omega\mu(2\pi r_{xt})(2\pi r_{xr})}{2\pi} \int_0^\infty \frac{\lambda}{2p_2} e^{-p_2 L} J_1(\lambda r_{xt}) J_1(\lambda r_{xr}) d\lambda$$

$$F_a = \frac{i\omega\mu(2\pi r_{xt})(2\pi r_{xr})}{2\pi^2 \text{Det}} \quad (5)$$
$$\begin{bmatrix} \frac{I_1(p_2 * r_{md})}{K_1(p_2 * r_{md})} \frac{K_1(p_2 * r_{tl})}{I_1(p_2 * r_{tl})} K_1(p_2 * r_{xt}) I_1(p_2 * r_{xr}) \frac{\alpha_{11}\alpha_{22}}{\alpha_{12}\alpha_{21}} \\ - \frac{K_1(p_2 * r_{tl})}{I_1(p_2 * r_{tl})} I_1(p_2 * r_{xt}) I_1(p_2 * r_{xr}) \frac{\alpha_{22}}{\alpha_{21}} \end{bmatrix}$$

$$F_b = \frac{i\omega\mu(2\pi r_{xt})(2\pi r_{xr})}{2\pi^2 \text{Det}} \quad (6)$$
$$\begin{bmatrix} \frac{I_1(p_2 * r_{md})}{K_1(p_2 * r_{md})} \frac{K_1(p_2 * r_{tl})}{I_1(p_2 * r_{tl})} I_1(p_2 * r_{xt}) K_1(p_2 * r_{xr}) \frac{\alpha_{11}\alpha_{22}}{\alpha_{12}\alpha_{21}} \\ - \frac{I_1(p_2 * r_{md})}{K_1(p_2 * r_{md})} K_1(p_2 * r_{xt}) K_1(p_2 * r_{xr}) \frac{\alpha_{11}}{\alpha_{12}} \end{bmatrix}$$

$$p_j^2 = k_j^2 + \lambda_j^2 \quad (7)$$

$$\alpha_{11} = 1 - \frac{p_2}{p_1} \frac{I_1(p_1 * r_{md})}{I_0(p_1 * r_{md})} \frac{I_0(p_2 * r_{md})}{I_1(p_2 * r_{md})} \quad (8)$$

$$\alpha_{12} = 1 + \frac{p_2}{p_1} \frac{I_1(p_1 * r_{md})}{I_0(p_1 * r_{md})} \frac{K_0(p_2 * r_{md})}{K_1(p_2 * r_{md})} \quad (9)$$

$$\alpha_{21} = 1 + \frac{p_2}{p_3} \frac{K_1(p_3 * r_{tl})}{K_0(p_3 * r_{tl})} \frac{I_0(p_2 * r_{tl})}{I_1(p_2 * r_{tl})} \quad (10)$$

$$\alpha_{22} = 1 - \frac{p_2}{p_3} \frac{K_1(p_3 * r_{tl})}{K_0(p_3 * r_{tl})} \frac{K_0(p_2 * r_{tl})}{K_1(p_2 * r_{tl})} \quad (11)$$

$$\text{Det} = 1 - \frac{I_1(p_2 * r_{md})}{K_1(p_2 * r_{md})} \frac{K_1(p_2 * r_{tl})}{I_1(p_2 * r_{tl})} \frac{\alpha_{11}\alpha_{22}}{\alpha_{12}\alpha_{21}} \quad (12)$$

The transient responses are obtained by generating a step function of electric current in the transmitter antenna. Then the response in time domain $E_f(t)$ can be obtained by applying Fourier transform to the frequency response (4):

$$E_f(t) = \frac{2}{\pi}\int_0^\infty \text{Im}[E_f(\omega)] \cdot \frac{\sin(\omega t)}{\omega} d\omega \quad (13)$$
$$= \frac{2}{\pi}\int_0^\infty \text{Re}[E_f(\omega)] \cdot \frac{\cos(\omega t)}{\omega} d\omega$$

Figure 3:
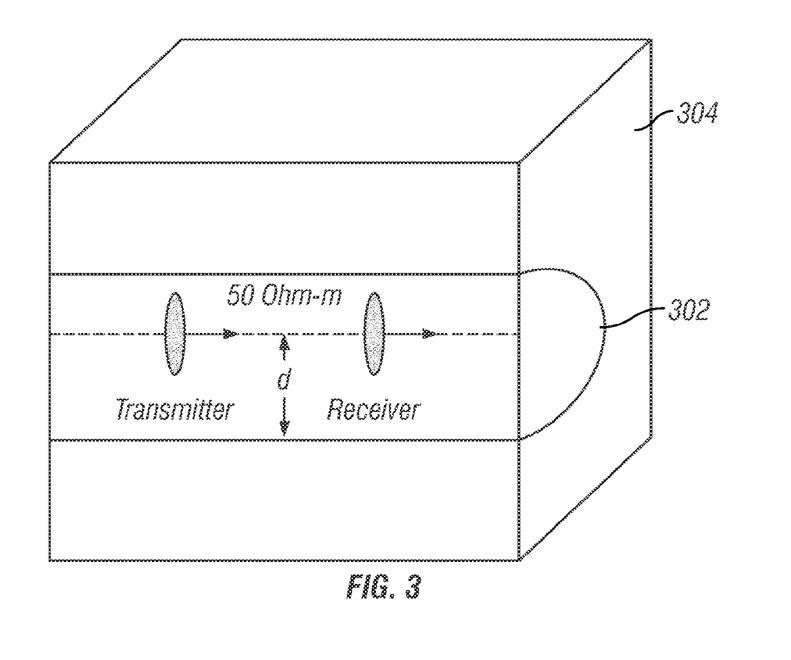
FIG. 3 shows a cylindrical model of the borehole configuration.
Figure 4:
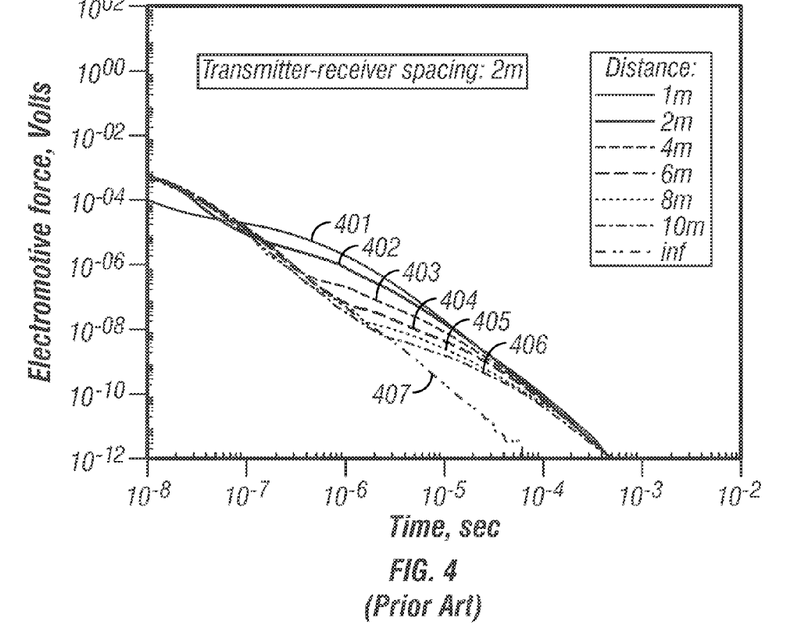
FIG. 4 (prior art) shows transient responses due to the remote cylindrical boundary in the configuration of FIG. 3 in the presence of a perfectly conducting drill pipe.

FIG. 3 shows a practical example of the cylindrical model with two formation layers: 50 $\Omega$-m formation shown at 302 and 2 $\Omega$-m formation shown at 304. FIG. 4 shows the responses at a distance to boundary of 1, 2, 4, 6, 8, and 10 meters are shown as 401, 402, 403, 404, 405, and 406, respectively. The response for an infinite distance is shown as 407.

Figure 5:
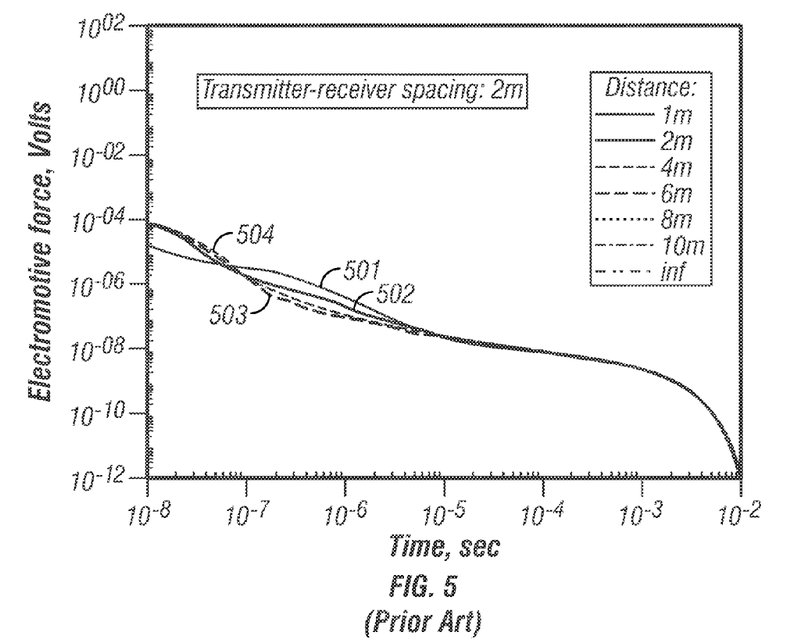
FIG. 5 (prior art) shows transient responses due to a remote boundary when the drill pipe has a conductivity $\sigma=1.4*10^6$ S/m.

FIG. 5 shows the transient responses obtained in the presence of a typical conductive pipe. The conductivity is $\sigma = 1.4 * 10^6$ S/m. Curves 501, 502, and 503, indicate responses at distances of 1, 2, and 4 meters to a remote boundary. Response curve 504 represents the response to a remote boundary at an infinite distance. Response curve 504 is nearly indistinguishable from and overlaps response curves at a distance of 6 m, 8 m, and 10 m. FIG. 5 illustrates the fact that at late times corresponding to deep investigation the conductive pipe signal typically dominates the transient response of the earth's formations by at least an order of magnitude. The main part of the conductive pipe signal can be removed from received signal by using one of the following: modeling results for the pipe signal in air, lab measurements of the pipe signal, and by using bucking coil. In practice, there will be always a part of the pipe signal left due to instability of the pipe signal caused by drilling environment. The causes of the instability can be temperature dependence of electric conductivity of the pipe, changing effective distance between the transmitter and the receiver due to bending of the drill pipe, changing effective cross-sectional area of the receiver and transmitter and others. The instability of pipe signal may produce low frequency noise comparable or exceeding the formation signal especially at late times.

The present disclosure teaches the elimination of the signal from conductive drill pipe in transient EM data based on acquiring an additional set of data at a late time interval beyond the time interval of interest. Due to faster decay of the formation signal the additionally acquired data contain negligible (less than a tolerable systematic error) portion of the formation signal, and therefore represents the response of only the drill pipe. The estimated drill pipe signal is then extrapolated back to the time interval of interest (typically 0.01-1 ms for the deep reading transient measurements) and subtracted from the receiver data. The extrapolation procedure may be applied to the drill pipe signal or to the drill pipe signal residuals remaining after a calibration procedure or after applying a bucking technique. Details of the method are discussed next.

Figure 6:
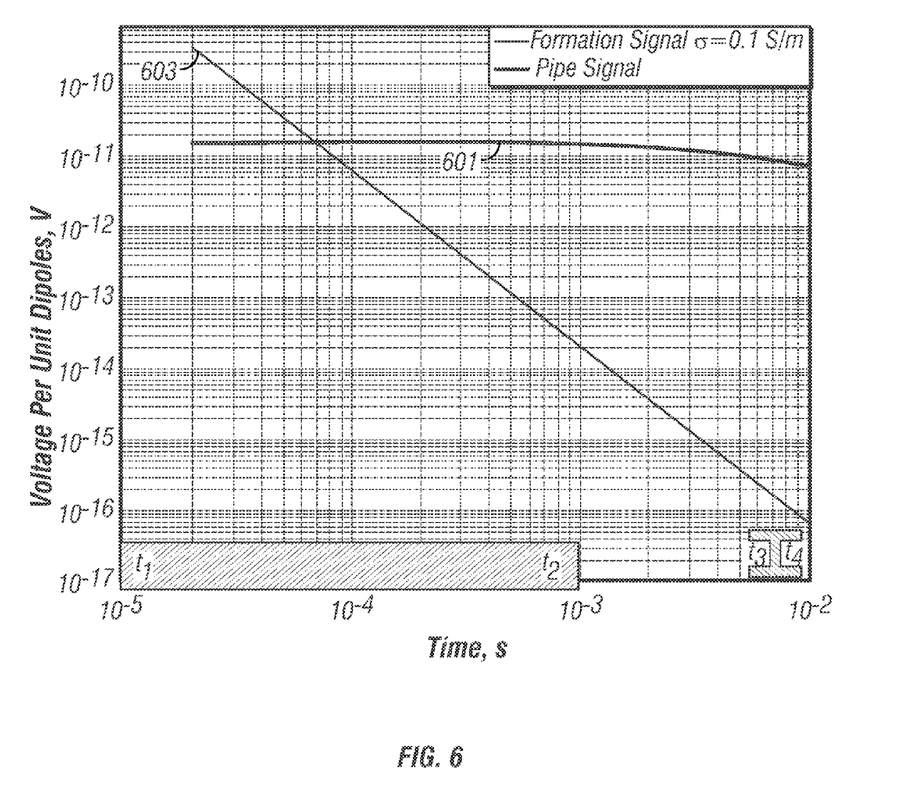
FIG. 6 shows transient responses over a time interval where the signal is dominated by the effect of a conducting drill pipe.

FIG. 6 shows a typical time-domain signal of a drill pipe 601 and a formation signal 603 for homogeneous medium with conductivity 0.1 S/m. Denoting by $(t_1, t_2)$ the time interval of interest for the formation signal, in the example shown it can be seen that if the time $t_2$ is 1 ms, then the formation signal at time $t_2$ exceeds the formation signal at t=6 ms by more than two orders of magnitude. In the example shown in FIG. 6, the values of $t_1$ and $t_2$ are $10^{-5}$ s and $10^{-3}$ s respectively. It is then assumed that the two orders of magnitude signal of drill pipe-formation signal ratio is sufficient to neglect the formation signal in a time interval $(t_3,t_4)$. In the example shown, the values of $t_3$ and $t_4$ are $6\times10^{-3}$ s and $10^{-2}$ s respectively. It is also assumed that the pipe voltage signal f in the receiver coil can be represented by known function of time t and a parameter vector $\vec{\beta}$. Then the drill pipe signal in the main data acquisition interval $(t_1,t_2)$ can be obtained from extrapolation of the data obtained in the additional time interval $(t_3,t_4)$ The following procedure can be used for the extrapolation.

The parameter vector $\vec{\beta}$ of the model function $f(t, \vec{\beta})$ can be determined by employing a least squares technique:

$$\sum_i |V_{pi} - f(t_i, \vec{\beta})|^2 \to \min, \; t_i \in (t_3, t_4), \quad (14)$$

Here $V_{pi}$ is the data vector acquired in the time interval $(t_3,t_4)$.

The model function $f(t, \vec{\beta})$ can be presented as a linearization with respect to the parameter vector:

$$f(t_i, \vec{\beta}) \approx f(t_i, \vec{\beta}_0) + \sum_j g(t_i)\Delta\beta_j, \quad (15)$$

where $f(t_i, \vec{\beta}_0)$ is a known function of a nominal value of the parameter $\vec{\beta}$ from calibration, $\Delta\beta_j$ are small variations of the parameters from their nominal values $\vec{\beta}_0$, and $g(t_i)$ are known time dependent coefficients–derivatives $$\frac{\partial f(t_i, \vec{\beta})}{\partial \beta_j}.$$

The possibility of linearization is practically enabled by the fact that the main part of the pipe signal is known either from modeling, or lab measurements (calibration procedure). It can be also measured (and subtracted from the receiver data) based on using a bucking coil. Then coefficients $g(t_i)$ can also be obtained beforehand from modeling or lab measurements. Then a linear least squares procedure can be used to determine variations $\Delta\beta_j$ of parameters $\beta_j$ from the calibrated data $V_{pci}$:

$$\sum_i \left| V_{pci} - \sum_j g(t_i) \cdot \Delta\beta_j \right|^2 \xrightarrow{LLS} \min, \; t_i \in (t_3, t_4), \quad (16)$$

Solution of the least squares problem (3) gives the parameter estimator $\Delta\hat{\beta}_j$ for each parameter variation. Then the estimated current value of the conductive pipe signal residuals in the interval of interest $(t_1,t_2)$ can be determined and then subtracted from the receiver data:

$$\text{Data}' = \text{Data} - \sum_j g(t_i)\Delta\hat{\beta}_j. \quad (17)$$

The calibration signal may be obtained by making measurements with the tool suspended in air. Transient signals are measured and using a selected fitting function, nominal values of the fitting parameters are derived by performing a least-squares fit to the measured calibration signal using the selected fitting function. The nominal values of the fitting parameter are then used in the linearized method discussed above. Using the calibration signal may avoid problems with non-uniqueness of the fitting.

In one embodiment of the invention, the function $f(t, \vec{\beta})$ is an exponential function of two parameters $\beta_1$ and $\beta_2$ given by:

$$f(t_i, \vec{\beta}) = \beta_1 e^{-\beta_2 t_i} \quad (18).$$

Such a representation is given as a simplified example and may be adequate to represent the response of a conductive drill pipe having a single diameter, thin wall and a single conductivity. For a more practical case where the portion of the drill pipe that contributes to the transient signal can be represented by the equations (5)-(13) for $\sigma_2=\sigma_3=0$.

Figure 7:
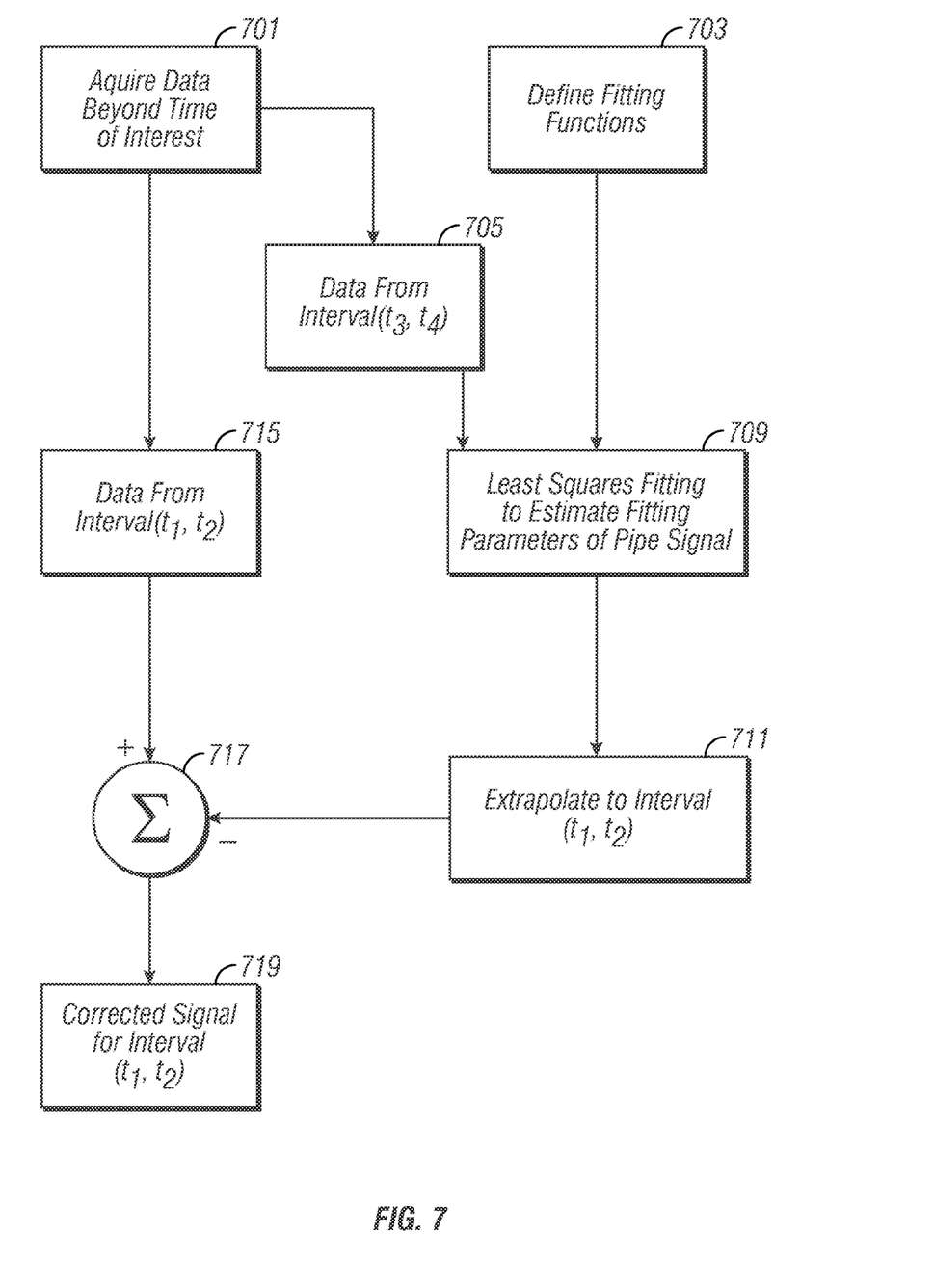
FIG. 7 shows a flow chart illustrating some of the steps of the present disclosure.

A flow chart of some of the steps of the present disclosure is shown in FIG. 7. Transient electromagnetic data are acquired over a time that exceeds the time of interest 701 for formation signals. This includes a time interval from $t_1$ (the first time of interest for the formation signal) to $t_4$ (the end of a time interval over which the drill pipe signal is dominant). This includes a first time interval $\{t_1,t_2\}$ where the signal is responsive to both the formation property and to the drill pipe, and a second time interval $\{t_3,t_4\}$ where the signal is responsive almost entirely to the pipe. A fitting function for the pipe signal is defined and linearized 703 near the nominal values of the pipe parameters. A least squares fit to data over the second time interval $\{t_3,t_4\}$ 705 is then carried out 709 to estimate a modified (by drilling environment) vector of parameter. Using the fitting parameters obtained at 709, the pipe signal is extrapolated to the first time interval $\{t_1,t_2\}$ 711 and then subtracted 717 from the signal over the time interval $\{t_1,t_2\}$ 717 to give a corrected signal for the interval $\{t_1,t_2\}$ 719. The corrected signal may be estimated for a plurality of different transmitter-receiver distances, and using prior art methods, such as a table lookup, the distance to the bed boundary may be estimated.

Figure 8:
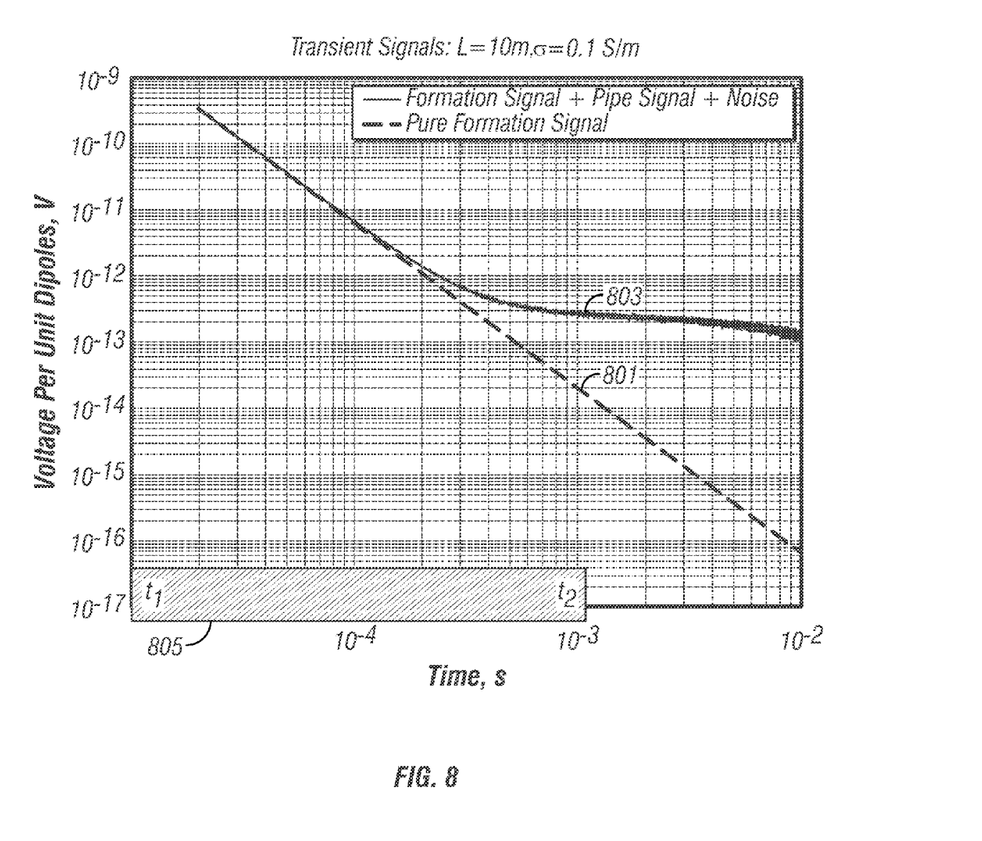
FIG. 8 shows an exemplary transient signal that includes a formation signal, pipe signal and noise.

Turning now to FIG. 8, an exemplary transient signal 803 is shown that includes a formation signal, pipe signal and additive measurement noise. For the example shown, the transmitter-receiver distance was 10 m and the formation conductivity was 0.1 S/m. Also shown in FIG. 8 is the signal that would be recorded in the absence of the pipe 801 (or with a pipe of infinite conductivity). The time interval of interest is from $10^{-5}$ s to $10^{-3}$ s. As can be seen, the pipe signal starts becoming important after about $3\times10^{-4}$ s, denoted by 805.

Figure 9:
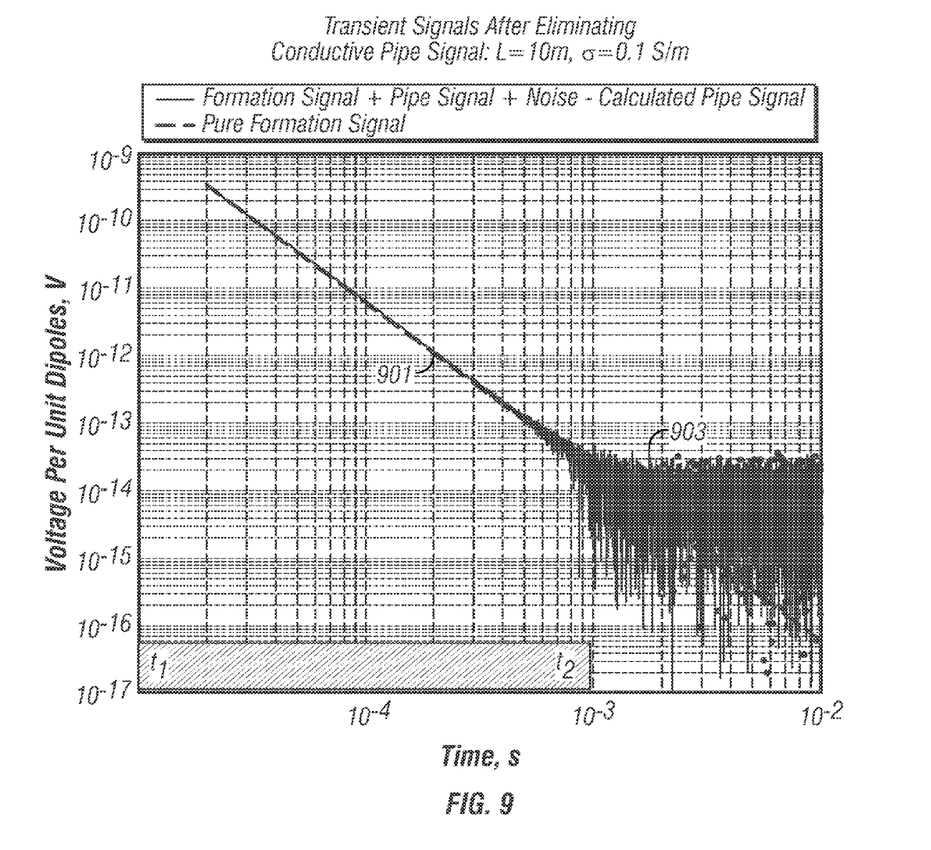
FIG. 9 shows the result of applying the method of the present disclosure to the signal of FIG. 8.

The result of applying the method of the present disclosure is shown in FIG. 9. The curve 903 shows the result of doing a least squares fit to the signal 903 over the time interval $\{t_3,t_4\}$, extrapolating back to the time interval of interest, and subtracting it from the original signal 803. As can be seen, the resultant curve is very close to the formation signal over the entire interval $\{t_1,t_2\}$ and can thus be inverted using prior art methods to give the formation properties, including conductivities and distance to an interface in the earth formation.

The disclosure has been described above with reference to a MWD apparatus carried on a drillstring. The method of the disclosure can also be used on other types of MWD apparatus conveyed on a drilling tubular, and may also be used on a logging tool carried on a wireline. The last such method is of relatively minor importance since on wireline devices, it is possible to have a housing of very high conductivity so that the correction methods described herein may not be necessary. Such means of conveyance would be known to those versed in the art and are not discussed further.

It should be further noted that while the example given about used axially oriented transmitters and receivers, this is not to be construed as a limitation. The method disclosed above may also be used with a transmitter and/or receiver oriented at an angle to the longitudinal axis of the logging tool. Specifically, using measurements made with axially oriented and transverse antennas as discussed in U.S. Pat. No. 7,167,006 to Itskovich, it is possible to get an accurate estimate of a distance to an interface and use it for reservoir navigation. The interface may be a gas-oil interface, an oil-water interface, a gas-water interface and/or a bed boundary. The estimated distance may be used for controlling a direction of drilling.

Implicit in the processing of the data is the use of a computer program on a suitable machine-readable medium that enables the processor to perform the control and processing. The machine-readable medium may include ROMs, EPROMs, EEPROMs, Flash Memories and Optical disks.

While the foregoing disclosure is directed to the specific embodiments of the disclosure, various modifications will be apparent to those skilled in the art. It is intended that all such variations within the scope and spirit of the appended claims be embraced by the foregoing disclosure.

What is claimed is:

1. A method of evaluating an earth formation using a tool conveyed within a borehole in the earth formation, the tool having a body with a finite, non-zero conductivity, the method comprising:
    using a transmitter on the tool for producing a transient electromagnetic signal in the earth formation;
        using at least one receiver for-producing a signal responsive to an interaction of the transient electromagnetic signal with the earth formation, the produced signal comprising a first time interval including a first component responsive to a property of the earth formation and a second component responsive to the conductivity of the tool, and a second time interval subsequent to the first time interval and responsive substantially to the conductivity of the tool; and
    estimating the first component of the produced signal in the first time interval by performing a least-squares fit only to the produced signal in the second time interval, extrapolating the least-squares fit to define a non-constant extrapolated signal in the first time interval, and subtracting the non-constant extrapolated signal from the produced signal.

2. The method of claim 1 further comprising using the estimated first component of the produced signal for estimating a value of the property of the earth formation.

3. The method of claim 1 wherein—the parameter of interest is at least one of (i) a resistivity property of the formation, and (ii) a distance to a bed boundary in the formation.

4. The method of claim 1 wherein performing the least squares fit further comprises using an exponential function.

5. The method of claim 1 wherein performing the least squares fit to the second time interval of the produced signal further comprises:
    defining a fitting function, and
    linearizing the fitting function about a nominal value of a fitting parameter.

6. The method of claim 5 further comprising estimating the nominal value of the fitting parameter using a calibration signal.

7. The method of claim 1 further comprising conveying the tool into the earth formation on one of (i) a drilling tubular, and (ii) a wireline.

8. The method of claim 2 further comprising controlling a direction of drilling using the estimated value of the property of the earth formation.

9. An apparatus configured to evaluate an earth formation the apparatus comprising:
    a tool having a body with a finite, non-zero conductivity configured to be conveyed in a borehole;
    a transmitter on the tool configured to produce a transient electromagnetic signal in the earth formation;
    at least one receiver configured to produce a signal responsive to interaction of the transient signal with the earth formation; the produced signal comprising a first time interval including a first component responsive to a property of the earth formation and a second component responsive to the conductivity of the tool, and a second time interval subsequent to the first time interval and responsive substantially to the conductivity of the tool; and
    at least one processor configured to estimate the first component of the produced signal in the first time interval by performing a least-squares fit only to the second time interval of the produced signal, extrapolating the least squares fit to define a non-constant extrapolated signal in the first time interval, and subtracting the non-constant extrapolated signal from the produced signal.

10. The apparatus of claim 9 wherein the at least one processor is further configured to use the estimated first component to estimate a value of the property of the earth formation.

11. The apparatus of claim 9, wherein the property of the earth formation is selected from: (i) a resistivity property of the formation, and (ii) a distance to an interface in the formation.

12. The apparatus of claim 9 wherein the at least one processor is further configured to perform the least-squares fit by further using an exponential function.

13. The apparatus of claim 9 wherein the at least-one processor is further configured to perform the least-squares fit to signal in the second time interval of the produced signal by further by further linearizing a fitting function about a nominal value of a fitting parameter.

14. The apparatus of claim 13 wherein the at least one processor is further configured to estimate a nominal value of the fitting parameter using a calibration signal.

15. The apparatus of claim 9 further comprising a conveyance device configured to convey the tool into the formation, the conveyance device being selected from: (i) a drilling tubular, and (ii) a wireline.

16. The apparatus of claim 10 wherein the at least one processor is further configured to control a direction of drilling based at least in part on the determined value of the property of the earth formation.

17. A non-transitory computer-readable medium product having instructions thereon that when read by at least one processor, causes the at least one processor to perform a method, the method comprising:

processing a signal produced by a receiver on a tool in a borehole responsive to a transient signal generated by a transmitter in the borehole to estimate a property of the earth formation, wherein the produced signal comprises a first time interval including a first component responsive to a property of the earth formation and a second component responsive to a conductivity of the tool, and a second time interval subsequent to the first time interval and responsive substantially to the conductivity of the tool; and wherein estimating the property of the earth formation further comprises performing a least-squares fit only to the signal in the second time interval, extrapolating the least-squares fit to the first time interval to define a non-constant extrapolated signal, and subtracting the non-constant extrapolated signal from the produced signal.

18. The non-transitory computer-readable medium product of claim 17 further comprising at least one of: (i) a ROM, (ii) an EPROM, (iii) an EEPROM, (iv) a flash memory, and (v) an optical disk.

* * * * *